US011649348B2

(12) United States Patent
Sawaguchi et al.

(10) Patent No.: US 11,649,348 B2
(45) Date of Patent: May 16, 2023

(54) RESIN COMPOSITION AND MEDICAL DRUG CONTAINER USING SAME

(71) Applicant: ZEON CORPORATION, Tokyo (JP)

(72) Inventors: Taichi Sawaguchi, Tokyo (JP); Satoshi Adachi, Tokyo (JP); Shinsuke Miyazawa, Tokyo (JP); Nozomi Yabuki, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 113 days.

(21) Appl. No.: 14/650,212

(22) PCT Filed: Nov. 29, 2013

(86) PCT No.: PCT/JP2013/082197
§ 371 (c)(1),
(2) Date: Jun. 5, 2015

(87) PCT Pub. No.: WO2014/087935
PCT Pub. Date: Jun. 12, 2014

(65) Prior Publication Data
US 2015/0322256 A1   Nov. 12, 2015

(30) Foreign Application Priority Data

Dec. 5, 2012 (JP) .............................. JP2012-265867
Aug. 22, 2013 (JP) .............................. JP2013-171819

(51) Int. Cl.
| | | |
|---|---|---|
| A61J 1/00 | (2023.01) | |
| C08L 53/02 | (2006.01) | |
| C08G 61/00 | (2006.01) | |
| C08L 47/00 | (2006.01) | |
| B65D 85/00 | (2006.01) | |
| C08G 61/06 | (2006.01) | |
| C08L 65/00 | (2006.01) | |
| C08L 25/08 | (2006.01) | |

(52) U.S. Cl.
CPC ............... C08L 53/02 (2013.01); A61J 1/00 (2013.01); B65D 85/00 (2013.01); C08G 61/00 (2013.01); C08G 61/06 (2013.01); C08L 47/00 (2013.01); *C08G 2261/3324* (2013.01); *C08G 2261/3325* (2013.01); *C08G 2261/3327* (2013.01); *C08G 2261/418* (2013.01); *C08L 25/08* (2013.01); *C08L 65/00* (2013.01); *C08L 2207/04* (2013.01); *Y10T 428/1352* (2015.01); *Y10T 428/1386* (2015.01)

(58) Field of Classification Search
CPC ...... C08L 65/02; C08L 65/04; C08L 23/0823; C08L 53/02; C08L 53/005; C08L 53/025; C08G 2261/3324; C08G 2261/3325; C08G 2261/418; C08G 61/06
USPC .......................................... 428/34.1–36.92
See application file for complete search history.

(56) References Cited

U.S. PATENT DOCUMENTS

| | | | | |
|---|---|---|---|---|
| 5,187,012 A | * | 2/1993 | Takahashi ................ | G11B 7/26 524/323 |
| 5,468,803 A | * | 11/1995 | Takahashi ................ | A61L 29/06 524/551 |
| 6,090,888 A | | 7/2000 | Khanarian et al. | |
| 6,331,591 B1 | | 12/2001 | Miyamoto et al. | |
| 6,525,144 B1 | * | 2/2003 | Tanahashi ................ | C08G 61/08 525/332.1 |
| 6,730,736 B1 | * | 5/2004 | Kaita ........................ | C08F 8/00 525/70 |
| 2003/0130421 A1 | * | 7/2003 | Sato ........................ | C08L 25/06 525/68 |
| 2003/0186085 A1 | * | 10/2003 | Murata ................ | G11B 5/7315 428/847 |
| 2006/0036033 A1 | * | 2/2006 | Toyoshima ................ | C08J 5/18 525/97 |
| 2009/0008808 A1 | * | 1/2009 | Takahashi ................ | B29C 33/40 264/1.7 |
| 2010/0076396 A1 | * | 3/2010 | Takahashi ................ | B32B 15/08 604/408 |
| 2010/0092712 A1 | * | 4/2010 | Ogawa ................ | C08G 61/08 428/36.92 |
| 2014/0213728 A1 | | 7/2014 | Kosaka et al. | |
| 2017/0218191 A1 | | 8/2017 | Yabuki et al. | |

FOREIGN PATENT DOCUMENTS

| | | | |
|---|---|---|---|
| EP | 0559146 A1 | 9/1993 | |
| JP | H03-223328 A | 10/1991 | |
| JP | H05-247324 A | 9/1993 | |
| JP | 2000-154238 A | 6/2000 | |
| JP | 2002-097259 A | 4/2002 | |
| JP | 2002-179775 * | 6/2002 | ............. C08G 61/08 |

(Continued)

OTHER PUBLICATIONS

Polymer Properties Database, "Styrene-Ethylene-Butylene-Styrene Thermoplastic Elastomer (SEBS) Properties and Applications." 2018, http://polymerdatabase.com/Polymer%20Brands/SEBS.html (Year: 2018).*
Tuftec(TM) Hydrogenated Styrenic Thermoplastic Elastomer (SEBS) Product Brochure, pp. 2 and 4, Asahi Kasei Chemicals Corporation, Apr. 2015, http://www.akelastomer.com/ (Year: 2015).*
"Understanding Different Impact Tests Using ASTM & ISO Standards—Charpy | Izod | Multi-Axial", Entec Polymers, Entecpolymers.com, Feb. 26, 2020, accessed Jan. 12, 2023 online: https://s3.amazonaws.com/entecpolymers/v3/uploads/pdfs/Understanding-Different-Impact-Tests-Using-ASTM-ISO-Standards-RGB. (Year: 2020).*
Jun. 9, 2015 International Preliminary Report on Patentability issued in International Application No. PCT/JP2013/082197.
Mar. 11, 2014 International Search Report issued in Application No. PCT/JP2013/082197.

(Continued)

*Primary Examiner* — Michael C Romanowski
(74) *Attorney, Agent, or Firm* — Oliff PLC

(57) ABSTRACT

A medicine container which absorbs very little protein over time is manufactured using a resin composition including 50 to 99 wt % of a norbornene-based polymer, and 1 to 50 wt % of a hydrogenated styrene-based thermoplastic elastomer, a content of a low-molecular-weight component having a weight average molecular weight of 1000 or less in the resin composition being 3 wt % or less.

15 Claims, No Drawings

(56) References Cited

FOREIGN PATENT DOCUMENTS

| | | | | | |
|---|---|---|---|---|---|
| JP | 2002-179775 | A | 6/2002 | | |
| JP | 2003-183361 | A | 7/2003 | | |
| JP | 2005-254508 | A | 9/2005 | | |
| JP | 2005254508 | * | 9/2005 | ............ | B32B 27/00 |
| JP | 2009-056775 | A | 3/2009 | | |
| JP | 2009056775 | * | 3/2009 | ............ | B32B 27/32 |
| JP | 2012-097146 | A | 5/2012 | | |

OTHER PUBLICATIONS

Mar. 7, 2018 Office Action issued in U.S. Appl. No. 15/844,946.
Nov. 26, 2018 Office Action issued in U.S. Appl. No. 15/844,946.
Oct. 30, 2019 Office Action issued in U.S. Appl. No. 15/844,946.
May 28, 2020 Office Action issued in U.S. Appl. No. 15/844,946.
Apr. 9, 2021 Office Action issued in U.S. Appl. No. 15/844,946.
Dec. 10, 2021 Office Action issued in U.S. Appl. No. 15/844,946.
Jul. 7, 2022 Office Action Issued in U.S. Appl. No. 15/844,946.
Feb. 13, 2023 Office Action issued in U.S. Appl. No. 15/844,946.

\* cited by examiner

RESIN COMPOSITION AND MEDICAL DRUG CONTAINER USING SAME

TECHNICAL FIELD

The present invention relates to a resin composition, and a medicine container (drug container) that is formed using the resin composition, and shows low protein adsorption.

BACKGROUND ART

Patent Document 1 discloses a multilayer film that is formed using a cycloolefin-based resin as a material for producing a medicine container. Patent Document 1 is silent about the content of a low-molecular-weight component, and protein adsorption on the film. In Patent Document 1, the cycloolefin-based resin is used as a component of a barrier layer and an adhesive layer, and the innermost sealing layer that comes in contact with a medicine is formed using an olefin-based resin.

Patent Document 2 discloses a laminate film that can form a container (e.g., package (bag)) and includes a base layer and a sealant layer, and discloses that the sealant layer includes a polycycloolefin-based resin as a main component. Patent Document 2 discloses that the container suppresses a change in composition of the content and contamination of the content due to adsorption of a component of the content on the inner wall of the container, or elution of a low-molecular-weight component (e.g., residual monomer or multimer thereof) from the container to the content. However, Patent Document 2 is silent about a hydrogenated styrene-based thermoplastic elastomer that may be mixed with the polycycloolefin-based resin, the content of a low-molecular-weight component, and the like.

Patent Document 3 discloses that an alicyclic structure-containing polymer resin and a hydrogenated styrene-butadiene-styrene block copolymer (i.e., hydrogenated styrene-based thermoplastic elastomer) (soft polymer) may be mixed to prepare an alicyclic structure-containing polymer resin material that is used to produce a blow-molded container. However, Patent Document 3 does not disclose a specific example in which such a soft polymer is used. Patent Document 3 is silent about the content of a low-molecular-weight component.

Patent Document 4 discloses that an isobutylene-based block copolymer that includes a polymer block that mainly includes an aromatic vinyl compound, and a polymer block that mainly includes isobutylene, may be mixed with a cycloolefin-based copolymer to prepare a cycloolefin-based copolymer resin composition that exhibits transparency, impact resistance, and stress whitening resistance in a well-balanced manner. However, Patent Document 4 is silent about the content of a low-molecular-weight component.

Patent Document 5 discloses that a forming material that is prepared using pellets of a thermoplastic saturated norbornene-based polymer for which the content of a volatile component is reduced by drying the pellets, prevents occurrence of microvoids due to foaming during forming, and produces a film-like or sheet-like formed article that does not show a decrease in strength. However, Patent Document 5 is silent about using a hydrogenated styrene-based thermoplastic elastomer in combination with the thermoplastic saturated norbornene-based polymer.

Patent Document 6 discloses that an optical material that is formed of a resin composition that includes a thermoplastic saturated norbornene-based resin, and an additive that is immiscible with the thermoplastic saturated norbornene-based resin, and is dispersed in the thermoplastic saturated norbornene-based resin as minute microdomains, exhibits improved adhesion to a coating material and a film, and has excellent external appearance (e.g., excellent transparency). In Patent Document 6, the additive is used in an amount of 0.001 to 0.8 parts by weight (i.e., less than 1 part by weight) based on 100 parts by weight of the thermoplastic saturated norbornene-based resin. Patent Document 6 is silent about the content of a low-molecular-weight component.

RELATED-ART DOCUMENT

Patent Document

Patent Document 1: JP-A-2009-056775
Patent Document 2: JP-A-2005-254508
Patent Document 3: JP-A-2000-154238
Patent Document 4: JP-A-2012-097146
Patent Document 5: JP-A-3-223328
Patent Document 6: JP-A-5-247324

SUMMARY OF THE INVENTION

Technical Problem

The inventors of the invention found that, when a medicine that includes a protein is put in a container that is formed of a resin composition that includes a norbornene-based polymer and a hydrogenated styrene-based thermoplastic elastomer, the amount of protein adsorption on the container increases with the passage of time.

The inventors conducted extensive studies in order to reduce protein adsorption on a container that is formed of a resin composition that includes a norbornene-based polymer and a hydrogenated styrene-based thermoplastic elastomer. As a result, the inventors found that it is possible to remarkably suppress protein adsorption by utilizing a resin composition that includes a norbornene-based polymer and a hydrogenated styrene-based thermoplastic elastomer, the content of a low-molecular-weight component having a weight average molecular weight of 1000 or less in the resin composition being 3 wt % or less. This finding has led to the completion of the invention.

Solution to Problem

According to one aspect of the invention, a resin composition includes 50 to 99 wt % of a norbornene-based polymer, and 1 to 50 wt % of a hydrogenated styrene-based thermoplastic elastomer, the content of a low-molecular-weight component having a weight average molecular weight of 1000 or less in the resin composition being 3 wt % or less.

In the resin composition according to one aspect of the invention, the norbornene-based polymer may be a hydrogenated norbornene-based ring-opening polymer.

In the resin composition according to one aspect of the invention, the hydrogenated styrene-based thermoplastic elastomer may be at least one hydrogenated styrene-based thermoplastic elastomer selected from the group consisting of a styrene-ethylene/butylene-styrene block copolymer,
a styrene-ethylene/propylene-styrene block copolymer,
a partially hydrogenated styrene-ethylene/butylene-styrene block copolymer, and
a styrene-(ethylene-ethylene/propylene)-styrene block copolymer.

In the resin composition according to one aspect of the invention, the hydrogenated styrene-based thermoplastic elastomer may be a styrene-ethylene/butylene-styrene block copolymer.

In the resin composition according to one aspect of the invention, the hydrogenated styrene-based thermoplastic elastomer may be a block copolymer that includes an aromatic vinyl compound-based polymer block and an isobutylene-based polymer block.

In the resin composition according to one aspect of the invention, the content of a low-molecular-weight component having a weight average molecular weight of 1000 or less in the resin composition may have been adjusted to 3 wt % or less using one method, or a plurality of methods, among (I) evaporative removal of a low-molecular-weight component from the norbornene-based polymer, (II) reprecipitation of the norbornene-based polymer using a good solvent and a poor solvent, and (III) preliminary drying of pellets before forming.

According to another aspect of the invention, a medicine container is obtained using the resin composition according to one aspect of the invention.

The medicine container according to the above aspect of the invention may be used for a medicine that includes a protein.

Advantageous Effects of the Invention

The medicine container that is formed using the resin composition according to the invention can remarkably suppress protein adsorption on the container when the medicine includes a protein.

DESCRIPTION OF EMBODIMENTS

Norbornene-Based Polymer

The norbornene-based polymer is obtained by polymerizing a norbornene-based monomer (i.e., a monomer that includes a norbornene skeleton). The norbornene-based polymer is roughly classified into a norbornene-based polymer that is obtained by ring-opening polymerization, and a norbornene-based polymer that is obtained by addition polymerization.

Examples of the norbornene-based polymer that is obtained by ring-opening polymerization include a ring-opening polymer of a norbornene-based monomer, a ring-opening polymer of a norbornene-based monomer and an additional monomer that can undergo ring-opening copolymerization with the norbornene-based monomer, hydrogenated products thereof, and the like. Examples of the norbornene-based polymer that is obtained by addition polymerization include an addition polymer of a norbornene-based monomer, an addition polymer of a norbornene-based monomer and an additional monomer that can undergo addition copolymerization with the norbornene-based monomer, and the like. Among these, a hydrogenated ring-opening polymer of a norbornene-based monomer is preferable from the viewpoint of heat resistance, mechanical strength, water vapor barrier properties, and the like.

Examples of the norbornene-based monomer include bicyclo[2.2.1]hept-2-ene (trivial name: norbornene), a derivative thereof (i.e., in which the ring is substituted with a substituent), tricyclo[$4.3.0^{1,6}.1^{2,5}$]deca-3,7-diene (trivial name: dicyclopentadiene), a derivative thereof, 7,8-benzo-tricyclo[$4.3.0.1^{2,5}$]dec-3-ene (trivial name: methanotetrahydrofluorene or 1,4-methano-1,4,4a,9a-tetrahydrofluorene), a derivative thereof, tetracyclo[$4.4.0.1^{2,5}.1^{7,10}$]dodec-3-ene (trivial name: tetracyclododecene), a derivative thereof, and the like.

Examples of a substituent include an alkyl group, an alkylene group, a vinyl group, an alkoxycarbonyl group, an alkylidene group, and the like. The norbornene-based monomer may include these substituents in combination. Specific examples of a substituted norbornene-based monomer include
8-methoxycarbonyltetracyclo[$4.4.0.1^{2,5}1^{7,10}$]dodec-3-ene,
8-methyl-8-methoxycarbonyltetracyclo[$4.4.0.1^{2,5}.1^{7,10}$]dodec-3-ene,
8-ethylidenetetracyclo[$4.4.0.1^{2,5}.1^{7,10}$]dodec-3-ene, and the like.

These norbornene-based monomers may be used either alone or in combination.

Examples of the additional monomer that can undergo ring-opening copolymerization with the norbornene-based monomer include a monocyclic cycloolefin-based monomer such as cyclohexene, cycloheptene, and cyclooctene, and the like.

These additional monomers that can undergo ring-opening copolymerization with the norbornene-based monomer may be used either alone or in combination. When subjecting the norbornene-based monomer and the additional monomer that can undergo ring-opening copolymerization with the norbornene-based monomer, to ring-opening copolymerization, the norbornene-based monomer and the additional monomer are appropriately selected so that the weight ratio of structural units derived from the norbornene-based monomer to structural units derived from the additional monomer in the resulting ring-opening copolymer is normally 70:30 to 99:1, preferably 80:20 to 99:1, and more preferably 90:10 to 99:1.

Examples of the additional monomer that can undergo addition copolymerization with the norbornene-based monomer include an α-olefin having 2 to 20 carbon atoms, such as ethylene, propylene, 1-butene, 1-pentene, and 1-hexene, and derivatives thereof; a cycloolefin such as cyclobutene, cyclopentene, cyclohexene, cyclooctene, and 3a,5,6,7a-tetrahydro-4,7-methano-1H-indene, and derivatives thereof; a nonconjugated diene such as 1,4-hexadiene, 4-methyl-1,4-hexadiene, 5-methyl-1,4-hexadiene, and 1,7-octadiene; and the like. Among these, an α-olefin is preferable, and ethylene is particularly preferable.

These additional monomers that can undergo addition copolymerization with the norbornene-based monomer may be used either alone or in combination. When subjecting the norbornene-based monomer and the additional monomer that can undergo addition copolymerization with the norbornene-based monomer, to addition copolymerization, the norbornene-based monomer and the additional monomer are appropriately selected so that the weight ratio of structural units derived from the norbornene-based monomer to structural units derived from the additional monomer in the resulting addition copolymer is normally 30:70 to 99:1, preferably 50:50 to 97:3, and more preferably 70:30 to 95:5.

The ring-opening polymer of the norbornene-based monomer, or the ring-opening polymer of the norbornene-based monomer and the additional monomer that can undergo ring-opening copolymerization with the norbornene-based monomer, may be obtained by polymerizing the monomer component(s) in the presence of a known ring-opening polymerization catalyst. Examples of the ring-opening polymerization catalyst include a catalyst that includes a halide, a nitrate, or an acetylacetone compound of a metal such as ruthenium or osmium, and a reducing agent, and a catalyst that includes a halide or an acetylacetone compound of a metal such as titanium, zirconium, tungsten, or molybdenum, and an organoaluminum compound.

The hydrogenated ring-opening polymer of the norbornene-based monomer may be obtained by adding a known hydrogenation catalyst that includes a transition metal such as nickel or palladium to a solution of the ring-opening polymer, and hydrogenating the carbon-carbon unsaturated bonds of the ring-opening polymer.

The addition polymer of the norbornene-based monomer, or the addition polymer of the norbornene-based monomer and the additional monomer that can undergo addition copolymerization with the norbornene-based monomer, may be obtained by polymerizing the monomers) in the presence of a known addition polymerization catalyst, such as a catalyst that includes a titanium compound, a zirconium compound, or a vanadium compound, and an organoaluminum compound.

Hydrogenated Styrene-Based Thermoplastic Elastomer

The term "hydrogenated" used herein in connection with the hydrogenated styrene-based thermoplastic elastomer that is used in connection with the invention refers to a case where the styrene-based thermoplastic elastomer has been hydrogenated, or the hydrogenated styrene-based thermoplastic elastomer has been obtained by polymerizing a polymerizable monomer that includes one carbon-carbon double bond (e.g., butylene) (i.e., the styrene-based thermoplastic elastomer has been substantially hydrogenated). The hydrogenated styrene-based thermoplastic elastomer may be an aromatic vinyl-conjugated diene block copolymer that falls under the hydrogenated styrene-based thermoplastic elastomer, or a block copolymer that includes an aromatic vinyl compound-based polymer block and an isobutylene-based polymer block.

Aromatic vinyl-conjugated diene block copolymer that falls under hydrogenated styrene-based thermoplastic elastomer The aromatic vinyl-conjugated diene block copolymer that falls under the hydrogenated styrene-based thermoplastic elastomer includes a polystyrene block (hard segment) and a conjugated diene polymer block (soft segment), exhibits vulcanized rubber-like properties at a low temperature, and exhibits fluidity when melted by heating.

Examples of the aromatic vinyl-conjugated diene block copolymer that falls under the hydrogenated styrene-based thermoplastic elastomer include a styrene-ethylene/butylene-styrene block copolymer (SEBS), a styrene-ethylene/propylene-styrene block copolymer (SEPS), a partially hydrogenated styrene-ethylene/butylene-styrene block copolymer (partially hydrogenated SEBS), a styrene-(ethylene-ethylene/propylene)-styrene block copolymer (SEEPS), and the like. Among these, an aromatic vinyl-conjugated diene block copolymer in which the hydrogenation ratio of the conjugated diene moiety is substantially 100% (e.g., styrene-ethylene/butylene-styrene block copolymer (SEBS) and styrene-ethylene/propylene-styrene block copolymer (SEPS)) is preferable from the viewpoint of the transparency and the light resistance of the resin composition, and a styrene-ethylene/butylene-styrene block copolymer (SEBS) is particularly preferable.

The weight average molecular weight of the aromatic vinyl-conjugated diene block copolymer that falls under the hydrogenated styrene-based thermoplastic elastomer is not particularly limited, but is preferably 40,000 to 1,000,000, more preferably 40,000 to 800,000, and particularly preferably 40,000 to 500,000, from the viewpoint of mechanical strength and transparency when the resin composition is used for a container.

The weight ratio of the norbornene-based polymer in the resin composition according to the invention is 50 to 99 wt %, preferably 60 to 95 wt %, and more preferably 70 to 90 wt %, and the weight ratio of the aromatic vinyl-conjugated diene block copolymer (hydrogenated styrene-based thermoplastic elastomer) in the resin composition according to the invention is 1 to 50 wt %, preferably 5 to 40 wt %, and more preferably 10 to 30 wt %, taking account of mechanical strength and processability when the resin composition according to the invention is used for a container.

Block copolymer that includes aromatic vinyl compound-based polymer block and isobutylene-based polymer block The block copolymer that includes an aromatic vinyl compound-based polymer block and an isobutylene-based polymer block is a block copolymer that includes a polymer block that mainly includes an aromatic vinyl compound, and a polymer block that mainly includes isobutylene.

Examples of the aromatic vinyl compound include styrene, o-, m-, or p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, o-, m-, or p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-, m-, or p-t-butylstyrene, o-, m-, or p-methoxystyrene, o-, m-, or p-chloromethylstyrene, o-, m-, or p-bromomethylstyrene, a styrene derivative substituted with a silyl group, indene, vinylnaphthalene, and the like. Among these, styrene, α-methylstyrene, and a mixture thereof are preferable, and styrene is particularly preferable, from the viewpoint of industrial availability and a glass transition temperature.

The isobutylene-based polymer block includes a unit derived from isobutylene in a ratio of 60 wt % or more, and preferably 80 wt % or more.

The aromatic vinyl compound-based polymer block and the isobutylene-based polymer block may be formed using an additional monomer (aromatic vinyl compound or isobutylene) as a copolymerization component, and may be formed using an additional cationically polymerizable monomer component. Examples of such a monomer component include an aliphatic olefin, a diene, a vinyl ether, a silane, vinylcarbazole, β-pinene, acenaphthylene, and the like. These monomer components may be used either alone or in combination.

Examples of an aliphatic olefin-based monomer include ethylene, propylene, 1-butene, 2-methyl-1-butene, 3-methyl-1-butene, pentene, hexene, cyclohexene, 4-methyl-1-pentene, vinylcyclohexane, octene, norbornene, and the like.

Examples of a diene-based monomer include butadiene, isoprene, hexadiene, cyclopentadiene, cyclohexadiene, dicyclopentadiene, divinylbenzene, ethylidenenorbornane, and the like.

Examples of a vinyl ether-based monomer include methyl vinyl ether, ethyl vinyl ether, (n- or iso)propyl vinyl ether, (n-, sec-, tert-, or iso)butyl vinyl ether, methyl propenyl ether, ethyl propenyl ether, and the like.

Examples of a silane compound include vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, γ-methacryloyloxypropyltrimethoxysilane, γ-methacryloyloxypropylmethyldimethoxysilane, and the like.

The structure of the block copolymer that includes the aromatic vinyl compound-based polymer block and the isobutylene-based polymer block is not particularly limited as long as the block copolymer includes the aromatic vinyl compound-based polymer block and the isobutylene-based polymer block. The block copolymer may be a block copolymer, a diblock copolymer, a triblock copolymer, a multiblock copolymer or the like that has a linear, branched, or star-like structure, for example. It is preferable that the block copolymer that includes the aromatic vinyl compound-based polymer block and the isobutylene-based polymer block be a triblock copolymer consisting of "aromatic vinyl polymer block-isobutylene-based polymer block-aromatic vinyl polymer block" from the viewpoint of the balance between properties and formability (moldability). These block copolymers may be used either alone or in combination so that the desired properties and/or formability can be obtained.

The ratio of the aromatic vinyl polymer block to the isobutylene-based polymer block is not particularly limited. It is preferable that the content of the aromatic vinyl polymer block in the block copolymer that includes the aromatic vinyl compound-based polymer block and the isobutylene-based polymer block be 15 wt % or more, and more preferably more than 30 wt % and 35 wt % or less, from the viewpoint of flexibility, refractive index, and rubber elasticity.

The molecular weight of the block copolymer that includes the aromatic vinyl compound-based polymer block and the isobutylene-based polymer block is not particularly limited. It is preferable that the weight average molecular weight of the block copolymer determined by GPC be 30,000 to 300,000, and more preferably 30,000 to 250,000, from the viewpoint of fluidity, formability (moldability), and rubber elasticity. If the weight average molecular weight of the block copolymer is less than 30,000, the block copolymer may not exhibit sufficient mechanical properties. If the weight average molecular weight of the block copolymer exceeds 300,000, fluidity and processability may deteriorate. It is preferable that the ratio "weight average molecular weight/number average molecular weight" of the isobutylene-based block copolymer be 1.4 or less from the viewpoint of processing stability.

The block copolymer that includes the aromatic vinyl compound-based polymer block and the isobutylene-based polymer block may be produced using an arbitrary method. For example, the block copolymer that includes the aromatic vinyl compound-based polymer block and the isobutylene-based polymer block is produced by polymerizing the monomer components in the presence of a compound represented by the following general formula.

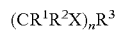

wherein X is a substituent selected from a halogen atom, an alkoxy group having 1 to 6 carbon atoms, and an acyloxy group, $R^1$ and $R^2$ are a hydrogen atom or a monovalent hydrocarbon group having 1 to 6 carbon atoms, provided that $R^1$ and $R^2$ are either identical or different, $R^3$ is a monovalent or polyvalent aromatic hydrocarbon group or a monovalent or polyvalent aliphatic hydrocarbon group, and n is a natural number from 1 to 6.

The compound represented by the general formula functions as an initiator. It is considered that the compound represented by the general formula generates a carbocation in the presence of a Lewis acid or the like to initiate cationic polymerization.

Examples of the compound represented by the general formula used in connection with the invention include (1-chloro-1-methylethyl)benzene, 1,4-bis(1-chloro-1-methylethyl)benzene, 1,3-bis(1-chloro-1-methylethyl)benzene, 1,3,5-tris(1-chloro-1-methylethyl)benzene, 1,3-bis(1-chloro-1-methylethyl)-5-(t-butyl)benzene, and the like. Among these, bis(1-chloro-1-methylethyl)benzene ($C_6H_4(C(CH_3)_2Cl)_2$) and tris(1-chloro-1-methylethyl)benzene (($ClC(CH_3)_2)_3C_6H_3$) are particularly preferable.

The block copolymer that includes the aromatic vinyl compound-based polymer block and the isobutylene-based polymer block may optionally be produced in the presence of a Lewis acid catalyst. The Lewis acid is not particularly limited as long as the Lewis acid can be used for cationic polymerization. Examples of a preferable Lewis acid include a metal halide such as $TiCl_4$, $TiBr_4$, $BCl_3$, $BF_3$, $BF_3 \cdot OEt_2$, $SnCl_4$, $SbCl_5$, $SbF_5$, $WCl_6$, $TaCl_5$, $VCl_5$, $FeCl_3$, $ZnBr_2$, $AlCl_3$, and $AlBr_3$; an organometal halide such as $Et_2AlCl$ and $EtAlCl_2$; and the like. Among these, $TiCl_4$, $BCl_3$, and $SnCl_4$ are preferable from the viewpoint of high catalytic reactivity and industrial availability. The Lewis acid may be used in an arbitrary amount taking account of the polymerization properties of the monomers, the polymerization concentration, and the like. The Lewis acid is normally used in an amount of 0.1 to 100 molar equivalents, and preferably 1 to 50 molar equivalents, based on the compound represented by the general formula.

The block copolymer that includes the aromatic vinyl compound-based polymer block and the isobutylene-based polymer block may optionally be produced in the presence of an electron donor component. It is considered that the electron donor component stabilizes a carbocation during cationic polymerization. It is possible to produce a polymer having a narrow molecular weight distribution and a controlled structure by adding the electron donor. The electron donor component is not particularly limited. Examples of the electron donor component include a pyridine, an amine, an amide, a sulfoxide, an ester, a metal compound that includes an oxygen atom that is bonded to a metal atom, and the like.

The block copolymer that includes the aromatic vinyl compound-based polymer block and the isobutylene-based polymer block may optionally be polymerized in an organic solvent. The organic solvent is not particularly limited as long as the organic solvent substantially does not hinder cationic polymerization. Specific examples of the organic solvent include a halogenated hydrocarbon such as methyl chloride, dichloromethane, chloroform, ethyl chloride, dichloroethane, n-propyl chloride, n-butyl chloride, and chlorobenzene; an alkylbenzene such as benzene, toluene, xylene, ethylbenzene, propylbenzene, and butylbenzene; a linear aliphatic hydrocarbon such as ethane, propane, butane, pentane, hexane, heptane, octane, nonane, and decane; a branched aliphatic hydrocarbon such as 2-methylpropane, 2-methylbutane, 2,3,3-trimethylpentane, and 2,2,5-trimethylhexane; a cyclic aliphatic hydrocarbon such as cyclohexane, methylcyclohexane, and ethylcyclohexane; a paraffin oil obtained by hydrogenating and purifying a petroleum fraction; and the like.

These solvents may be used either alone or in combination taking account of the balance between the polymerization properties of the monomers used to produce the block copolymer that includes the aromatic vinyl compound-based polymer block and the isobutylene-based polymer block, the solubility of the resulting polymer, and the like. The solvent is used in such an amount that the concentration of the polymer is 1 to 50 wt %, and preferably 5 to 35 wt %, taking account of the viscosity of the resulting polymer solution, and ease of heat removal.

When polymerizing the components, the components are mixed with cooling (e.g., −100° C. or more and less than 0° C.). The temperature range is particularly preferably −30 to −80° C. taking account of the balance between the energy cost and polymerization stability.

The block copolymer that includes the aromatic vinyl compound-based polymer block and the isobutylene-based polymer block is used in a ratio of 1 to 50 wt % based on 50 to 99 wt % of the norbornene-based polymer. The block copolymer that includes the aromatic vinyl compound-based polymer block and the isobutylene-based polymer block is preferably used in an amount of 1 to 50 parts by weight, and more preferably 3 to 25 parts by weight, based on 100 parts by weight of the norbornene-based polymer. If the amount of the block copolymer is too small, impact resistance may be insufficient. If the amount of the block copolymer is too large, the balance between rigidity and impact resistance may deteriorate.

Additive

The resin composition according to the invention may optionally include various additives (additives normally used in the resin industry) either alone or in combination.

The additive is not particularly limited as long as the additive is normally used for a thermoplastic resin material. Examples of the additive include an antioxidant, a UV absorber, a light stabilizer, a near-infrared absorber, a colorant (e.g., dye and pigment), a plasticizer, an antistatic agent, a fluorescent whitening agent, a resin, and the like.

Examples of the antioxidant include a phenol-based antioxidant, a phosphorus-based antioxidant, a sulfur-based antioxidant, and the like. Among these, a phenol-based antioxidant is preferable, and an alkyl-substituted phenol-based antioxidant is particularly preferable. These antioxidants may be used either alone or in combination. The content of the antioxidant in the resin composition is appropriately selected so that the object of the invention is not impaired. The content of the antioxidant in the resin composition is normally 0.001 to 5 wt %, preferably 0.01 to 3 wt %, and more preferably 0.1 to 1 wt %, based on the resin composition (=100 wt %) that includes the norbornene-based polymer and the hydrogenated styrene-based thermoplastic elastomer.

Examples of the UV absorber include a benzotriazole-based UV absorber, a benzoate-based UV absorber, a benzophenone-based UV absorber, an acrylate-based UV absorber, a metal complex-based UV absorber, and the like.

Examples of the light stabilizer include a hindered amine-based light stabilizer.

Examples of the near-infrared absorber include a cyanine-based near-infrared absorber; a pyrylium-based infrared absorber; a squarylium-based near-infrared absorber; a croconium-based infrared absorber; an azulenium-based near-infrared absorber; a phthalocyanine-based near-infrared absorber; a dithiol metal complex-based near-infrared absorber; a naphthoquinone-based near-infrared absorber; an anthraquinone-based near-infrared absorber; an indophenol-based near-infrared absorber; an azide-based near-infrared absorber; and the like.

The dye is not particularly limited as long as the dye is uniformly dispersed or dissolved in the resin composition. An oil-soluble dye (C.I. solvent dye) is normally used as the dye due to excellent compatibility with the resin composition used in connection with the invention. Specific examples of the oil-soluble dye include C.I. solvent dyes described in Color Index Vol. 3 (published by The Society of Dyers and Colourists), and the like.

Examples of the pigment include a diarylide-based pigment, an azo lake-based pigment, a condensed azo-based pigment, a benzimidazolone-based pigment, a quinacridone-based pigment, a perylene-based pigment, an anthraquinone-based pigment, and the like.

Examples of the plasticizer include a phosphoric acid triester-based plasticizer, phthalic acid ester-based plasticizer, a fatty acid (monobasic acid) ester-based plasticizer, a dihydric alcohol ester-based plasticizer, an oxy acid ester-based plasticizer, a hydrocarbon polymer of which the main skeleton mainly has a C—C or C═C structure and which is liquid at room temperature, and the like. Among these, a phosphoric acid triester-based plasticizer is preferable, and tricresyl phosphate and trixylyl phosphate are particularly preferable.

Examples of the antistatic agent include a long-chain alkyl alcohol such as stearyl alcohol and behenyl alcohol, a fatty acid ester of a polyhydric alcohol, such as glycerol monostearate and pentaerythritol monostearate, and the like. Among these, stearyl alcohol and behenyl alcohol are particularly preferable.

Examples of the resin used as the additive include a polyolefin resin to provides flexibility, and the like.

The content of these additives in the resin composition is appropriately selected so that the object of the invention is not impaired. The content of these additives in the resin composition is normally 0.001 to 5 wt %, and preferably 0.01 to 1 wt %, based on the total content (=100 wt %) of the norbornene-based polymer and the hydrogenated styrene-based thermoplastic elastomer.

Method for Producing Resin Composition

The above components are optionally used in a mixed state. The mixing method is not particularly limited as long as the additive is sufficiently dispersed in the polymer. For example, the components may be mixed using a method that kneads (mixes) the resin in a molten state using a mixer, a single-screw kneader, a twin-screw kneader, a roll, a Brabender, an extruder, or the like, a method that dissolves and disperses the components in an appropriate solvent, and removes the solvent using a coagulation method, a casting method, or a direct drying method, or the like.

When using a twin-screw kneader, the kneaded product is normally extruded in the shape of a strand (rod) in a molten state, cut to an appropriate length using a strand cutter, and pelletized.

The resin composition in which the content of a low-molecular-weight component having a weight average molecular weight of 1000 or less is 3 wt % or less may be obtained by (I) evaporative removal of a low-molecular-weight component from the norbornene-based polymer (hereinafter referred to as "direct drying method"), (II) reprecipitation of the norbornene-based polymer using a good solvent and a poor solvent (hereinafter referred to as "reprecipitation method"), or (III) preliminary drying of the resin composition (normally pellets of the resin composition) before forming. These methods may be used either alone or in combination. Note that it is preferable to use the method (III) since it is possible to also remove a low-molecular-weight component derived from the styrene-based thermoplastic elastomer that is mixed with the norbornene-based polymer.

The molecular weight of a low-molecular-weight component normally refers to the polyisoprene-equivalent weight average molecular weight (Mw) determined by gel permeation chromatography (GPC) using cyclohexane as an eluant (solvent). The content of a low-molecular-weight component having a weight average molecular weight of 1000 or less in the resin composition according to the invention is 3 wt % or less, preferably 2 wt % or less, and more preferably 1 wt % or less.

(I) Direct Drying Method

The direct drying method heats the reaction solution after synthesizing the norbornene-based polymer under reduced pressure (i.e., a pressure equal to or lower than normal pressure) to evaporate and remove the solvent and a low-molecular-weight component included in the norbornene-based polymer. When using the direct drying method, the heating temperature when heating the organic solvent solution (e.g., reaction solution) is normally 270 to 340° C., and preferably 275 to 330° C. If the heating temperature is too low, it may be difficult to efficiently remove a low-molecular-weight component included in the norbornene-based polymer, and the residual solvent. If the heating temperature is too high, the norbornene-based polymer may be decomposed due to heat. The direct drying method is normally implemented under a reduced pressure of 26.7 kPa or less, preferably 13.4 kPa or less, and more preferably 6.7 kPa or less. When applying the direct drying method, the drying operation may be performed while changing the heating temperature and the pressure (reduced pressure) stepwise or continuously. It is particularly preferable to change the heating temperature and/or the pressure (reduced pressure) in two steps.

The two-step drying operation can be easily performed by utilizing two or more solvent removal devices that can implement heating under reduced pressure. It is preferable to use a scraping thin film evaporator or a centrifugal thin film evaporator as the solvent removal device. Examples of a preferable two-step drying method include a drying method that heats the organic solvent solution (e.g., reaction solution) after synthesizing the norbornene-based polymer at 270 to 340° C. under a reduced pressure of 6.7 to 26.7 kPa to remove the organic solvent and a low-molecular-weight component (first step), and heats the organic solvent solution at 270 to 340° C. under a reduced pressure of less than 6.7 kPa to remove the remaining low-molecular-weight component (second step).

When using the direct drying method, it is preferable to add an antioxidant to the organic solvent solution (e.g., reaction solution) after synthesizing the norbornene-based polymer, and then heat the mixture under reduced pressure in order to suppress decomposition of the norbornene-based polymer. The antioxidant is normally used in an amount of 0.01 to 1 part by weight, preferably 0.02 to 0.8 parts by weight, and more preferably 0.03 to 0.5 parts by weight, based on 100 parts by weight of the norbornene-based polymer. If the amount of the antioxidant is too large, the antioxidant or a decomposition product of the antioxidant may serve as a low-molecular-weight component, and generate gas.

(II) Reprecipitation Method

The reprecipitation method dissolves the norbornene-based polymer in a good solvent, and then effects precipitation using a poor solvent to remove a low-molecular-weight component dissolved in the poor solvent. Examples of the good solvent include an aromatic solvent such as benzene, toluene, and xylene; a cellosolve-based solvent such as methyl cellosolve, ethyl cellosolve, and 1-methoxy-2-propanol; an ester-based solvent such as methyl lactate and ethyl lactate; a cycloolefin-based solvent such as cyclohexane, ethylcyclohexane, and 1,2-dimethylcyclohexane; a halogen-containing solvent such as 2,2,3,3-tetrafluoro-1-propanol, methylene chloride, and chloroform; an ether-based solvent such as tetrahydrofuran and dioxane; and the like.

Examples of the poor solvent include an alcohol-based solvent such as methanol, ethanol, 1-propanol, 2-propanol, and 1-butanol; a ketone-based solvent such as diacetone alcohol, acetone, 2-butanone, and methyl isobutyl ketone; and the like.

When using the reprecipitation method, the norbornene-based polymer is dissolved in the good solvent at a temperature of 5 to 50° C. (preferably 10 to 30° C.) and a concentration of 0.1 to 30 wt % (preferably 0.5 to 15 wt %), and adds the solution to the poor solvent (in a 5 to 50-fold weight (preferably 10 to 30-fold weight) based on the solution) at a temperature of 5 to 50° C. (preferably 10 to 30° C.) to effect reprecipitation. The reprecipitation operation may be performed only once, or may optionally be repeated about 2 to 5 times.

This makes it possible to remove a low-molecular-weight component from the norbornene-based polymer.

(III) Preliminary Drying Before Forming

The norbornene-based polymer used in connection with the invention may be subjected to preliminary drying before extrusion or forming (molding) in order to prevent production of a low-molecular-weight component due to decomposition. It is effective to perform preliminary drying at a high temperature for a long time. However, if the preliminary drying temperature is higher than the glass transition temperature of the resin, pellets of the norbornene-based polymer may be thermally fused, and the effect is saturated within several hours. Therefore, it is preferable to subject the norbornene-based polymer to preliminary drying at (Tg-30) to (Tg-5)° C. (more preferably (Tg-20) to (Tg-5)° C.) for 2 to 24 hours (more preferably 4 to 12 hours). Note that production of a low-molecular-weight component due to decomposition can be prevented when preliminary drying is performed under vacuum, or performed under normal pressure in an air or nitrogen atmosphere.

The norbornene-based polymer used in connection with the invention is preferably extruded or formed in an atmosphere having a low oxygen concentration. In particular, it is possible to prevent production of a low-molecular-weight component due to decomposition of the norbornene-based polymer by performing a resin melting step in an atmosphere having a low oxygen concentration. Note that the term "atmosphere having a low oxygen concentration" used herein refers to an atmosphere having a partial pressure of oxygen of normally 100 hPa or less, preferably 50 hPa or less, and more preferably 20 hPa or less. The atmosphere having a low oxygen concentration may be achieved by setting the device to reduced pressure, or replacing the air inside the device with an inert gas or the like. Examples of the inert gas include argon, nitrogen, helium, neon, krypton, xenon, and the like. It is preferable to use nitrogen gas from the viewpoint of availability.

For example, nitrogen may be introduced into the raw material-feeding hopper of a processing device, or the hopper may be set to reduced pressure.

Forming of Resin Composition

The resin composition according to the invention may be formed (molded) using an arbitrary forming method as long as the resin composition can be formed. Examples of the forming method include an injection molding method, an extrusion blow molding method, an injection blow molding method, a two-step blow molding method, a multilayer blow molding method, a connection blow molding method, a stretch blow molding method, a rotational molding method, a vacuum molding method, an extrusion method, a calendering method, a solution casting method, a hot pressing method, an inflation method, and the like.

When forming a film using the resin composition according to the invention, a solvent casting method (solution casting method), a melt extrusion method, or the like may be used. It is preferable to use a melt extrusion method from the viewpoint of the production cost.

Medicine Container

Specific examples of the medicine container include a container for a liquid, powder, or solid medicine, such as a wide-mouth bottle, a narrow-mouth bottle, a vial, a prefillable syringe, a prefilled syringe, a vaccine prefilled syringe, an anticancer drug prefilled syringe, a needleless syringe, an ampule, a press through package, an infusion bag, a drop container, and a eye-drop container, a sampling test tube for blood examination, a blood collection tube, a sample container such as a specimen container, and the like.

In particular, a vial or a prefilled syringe that is formed of the resin composition according to the invention shows low protein adsorption, and ensures excellent medicine storage stability. Therefore, the resin composition according to the invention is suitably used for such a formed article.

EXAMPLES

The invention is further described below by way of examples and comparative examples. Note that the invention is not limited to the following examples.

In the examples and comparative examples, the unit "parts" refers to "parts by weight", and the unit "%" refers to "wt %", unless otherwise indicated.

The properties were measured as described below.

(1) The weight average molecular weight (Mw) and the number average molecular weight (Mn) of the norbornene-based polymer were measured as standard polyisoprene-equivalent values by gel permeation chromatography (GPC) using cyclohexane as an eluant.

(2) The hydrogenation ratio was determined by $^1$H-NMR spectroscopy.

(3) The glass transition temperature was measured in accordance with JIS K 7121 using a differential scanning calorimeter ("DSC6220" manufactured by SII Nano Technology Inc.). Specifically, the glass transition temperature was measured while the measurement target was heated to a temperature higher than the glass transition temperature by 30° C. or more, cooled to room temperature at a cooling rate of −10° C./min, and then heated at a heating rate of 10° C./min.

(4) The content of a low-molecular-weight component was determined by calculating a peak area (M1) corresponding to a weight average molecular weight of 1000 or more and a peak area (M2) corresponding to a weight average molecular weight of 1000 or less when the molecular weight of the resin composition was measured by GPC using cyclohexane as an eluant (see (1)), and calculating "M2/(M1+M2)×100".

(5) The protein adsorption was determined by casting a 1% cyclohexane solution onto a sensor chip, volatilizing the solvent by heating at 70° C. for 2 hours in a nitrogen atmosphere to form a cast film having a thickness of 1 μm, and causing an insulin aqueous solution (concentration: 3.53 mg/ml, pH: 7.8) to flow over the cast film for 300 seconds using an intermolecular interaction measurement device ("MI-Affinity (registered trademark)" manufactured by Konica Minolta Opto, Inc.) to measure an increase in thickness due to adsorption (feed rate: 20 μl/min, measurement temperature: 25° C.).

(6) The impact resistance was determined by performing an Izod impact test in accordance with JIS K 7110 using a specimen (thickness: 4.0 mm, length: 80 mm, width: 10.0 mm) (provided with a notch) prepared by injection molding.

Production Example 1

A reactor was charged with 500 parts of dehydrated cyclohexane, 0.82 parts of 1-hexene, 0.15 parts of dibutyl ether, and 0.30 parts of triisobutylaluminum at room temperature under a nitrogen atmosphere to obtain a mixture. 76 parts of tricyclo[4.3.0.1$^{2,5}$]deca-3,7-diene (trivial name: dicyclopentadiene, hereinafter referred to as "DCP"), 70 parts of 8-methyltetracyclo[4.4.0.1$^{2,5}$.1$^{7,10}$]dodec-3-ene (hereinafter referred to as "TCD"), 54 parts of tetracyclo[7.4.0.0$^{2,7}$.1$^{10,13}$]trideca-2,4,6,11-tetraene (hereinafter referred to as "MTF"), and 80 parts of tungsten hexachloride (0.7% toluene solution) were continuously added to the mixture in parallel over 2 hours while maintaining the temperature of the mixture at 45° C. to effect polymerization. 1.06 parts of butyl glycidyl ether and 0.52 parts of isopropyl alcohol were added to the polymer solution to inactivate the polymerization catalyst and terminate the polymerization reaction. The resulting reaction solution including a ring-opening polymer was subjected to gas chromatography. The polymerization conversion ratio of each monomer was 99.5%.

270 parts of cyclohexane was added to 100 parts of the reaction solution including a ring-opening polymer. After the addition of 5 parts of a nickel catalyst supported on a diatomaceous earth carrier (nickel ratio: 58 wt %, pore volume: 0.25 ml/g, specific surface area 180 m$^2$/g) as a hydrogenation catalyst, the mixture was heated to 200° C. with stirring under a hydrogen pressure of 5 MPa, and reacted for 8 hours to obtain a reaction solution including a hydrogenated DCP/TCD/MTF ring-opening copolymer. After removing the hydrogenation catalyst by filtration, the solvent (cyclohexane) and other volatile components were removed from the solution at 270° C. under a pressure of 1 kPa or less using a cylindrical evaporator (manufactured by Hitachi Ltd.). The residue was extruded in the shape of a strand in a molten state, and the extruded product was cooled, and pelletized to obtain pellets. The Mw of the pelletized hydrogenated ring-opening copolymer (norbornene-based polymer A) was 34,000. The hydrogenation ratio of the carbon-carbon bonds of the polymer was 99.8%. The polymer had a Tg of 136° C. and a specific gravity of 1.01 g/cm$^3$.

Production Example 2

A reaction vessel charged with 258 l of cyclohexane was charged with bicyclo[2.2.1]hept-2-ene (hereinafter referred to as "NB") (120 kg) at room temperature under a nitrogen stream, and the mixture was stirred for 5 minutes.

Triisobutylaluminum was added to the mixture so that the concentration in the system was 1.0 ml/l. Ethylene was circulated through the system with stirring under normal pressure to replace the atmosphere inside the system with an ethylene atmosphere. The internal temperature of the autoclave was maintained at 70° C., and the inside of the autoclave was pressurized with ethylene so that the internal pressure (gauge pressure) was 6 kg/cm². After stirring the mixture for 10 minutes, 0.4 l of a toluene solution including isopropylidene(cyclopentadienyl)(indenyl)zirconium dichloride and methylalumoxane was added to the system to initiate a copolymerization reaction between ethylene and NB. The concentration of isopropylidene(cyclopentadienyl)(indenyl)zirconium dichloride in the system was 0.018 mmol/l, and the concentration of methylalumoxane in the system was 8.0 mmol/l.

During polymerization, the temperature inside the system was maintained at 70° C., and the internal pressure (gauge pressure) of the system was maintained at 6 kg/cm² by continuously feeding ethylene to the system. When 60 minutes had elapsed, the polymerization reaction was terminated by adding isopropyl alcohol. After depressurization, the polymer solution was removed, and brought into contact with an aqueous solution prepared by adding 5 l of concentrated hydrochloric acid to 1 m³ of water in a ratio of 1:1 with vigorous stirring. The catalyst residue was thus transferred to the aqueous phase. After allowing the mixture to stand, the aqueous phase was removed (separated), and the residue was washed twice with water to purify and separate the polymer solution phase.

The polymer solution was brought into contact with acetone (3-fold amount) with vigorous stirring to precipitate a copolymer. The solid (copolymer) was filtered off, and sufficiently washed with acetone. In order to extract unreacted monomer present in the polymer, the solid was added to acetone at a concentration of 40 kg/m³, and an extraction operation was performed at 60° C. for 2 hours. After completion of the extraction operation, the solid was filtered off, and dried at 130° C. for 12 hours under a pressure of 350 mmHg while circulating nitrogen to obtain an ethylene-NB copolymer (norbornene-based polymer B).

Production Example 3

Production of block copolymer (C) that includes aromatic vinyl compound-based polymer block and isobutylene-based polymer block The atmosphere inside a polymerization vessel (2 l separable flask) was replaced with nitrogen. 456.4 ml of n-hexane (dried using a molecular sieve) and 656.3 ml of butyl chloride (dried using a molecular sieve) were added to the polymerization vessel using a syringe, and the polymerization vessel was cooled in a dry ice/methanol bath (−70° C.). A liquid-feeding tube made of Teflon (registered trademark) was connected to a pressure-resistant glass liquid collection tube provided with three-way stopcock and containing 235 ml (2910 mmol) of an isobutylene monomer, and the isobutylene monomer was fed to the polymerization vessel under nitrogen pressure. 0.733 g (3.2 mmol) of bis(1-chloro-1-methylethyl)benzene and 1.30 g (14 mmol) of α-picoline were added to the polymerization vessel. 8.67 ml (79.1 mmol) of titanium tetrachloride was then added to the polymerization vessel to initiate polymerization. The mixture was stirred at the same temperature for 3 hours from the initiation of polymerization, and a mixed solution of 149 g (1433 mmol) of a styrene monomer, 14.1 ml of n-hexane, and 20.4 ml of butyl chloride that was cooled to −70° C. in advance was added to the polymerization vessel. After 2.5 hours had elapsed, a large quantity of water was added to the polymerization vessel to terminate the reaction.

The reaction solution was washed twice with water, and the solvent was evaporated. The resulting polymer was dried at 60° C. for 24 hours under vacuum to obtain a block copolymer (C) having an Mw of 160,000.

Production Example 4

Production of block copolymer (D) that includes aromatic vinyl compound-based polymer block and isobutylene-based polymer block The atmosphere inside a polymerization vessel (2 l separable flask) was replaced with nitrogen. 456.1 ml of n-hexane (dried using a molecular sieve) and 656.5 ml of butyl chloride (dried using a molecular sieve) were added to the polymerization vessel using a syringe, and the polymerization vessel was cooled in a dry ice/methanol bath (−70° C.). A liquid-feeding tube made of polytetrafluoroethylene was connected to a pressure-resistant glass liquid collection tube provided with three-way stopcock and containing 196 ml (2425 mmol) of an isobutylene monomer, and the isobutylene monomer was fed to the polymerization vessel under nitrogen pressure. 0.647 g (2.8 mmol) of bis(1-chloro-1-methylethyl)benzene and 1.22 g (14 mmol) of N,N-dimethylacetamide were added to the polymerization vessel. 8.67 ml (79.1 mmol) of titanium tetrachloride was then added to the polymerization vessel to initiate polymerization. The mixture was stirred at the same temperature for 1.5 hours from the initiation of polymerization, and a mixed solution of 124 g (1194 mmol) of a styrene monomer, 23.9 ml of n-hexane, and 34.3 ml of butyl chloride that was cooled to 70° C. in advance was added to the polymerization vessel. About 40 ml of methanol was added to the polymerization vessel when 45 minutes had elapsed after the addition of the mixed solution to terminate the reaction.

After evaporating the solvent from the reaction solution, a solid precipitate was dissolved in toluene, and washed twice with water. The toluene solution was added to a large quantity of methanol to precipitate a polymer. The resulting polymer was dried at 60° C. for 24 hours under vacuum to obtain a block copolymer (D) having an Mw of 100,000.

Example 1

99 parts of the norbornene-based polymer A obtained in Production Example 1, 1 part of an aromatic vinyl-conjugated diene block copolymer (E) ("Tuftec (registered trademark) H1043" manufactured by Asahi Kasei Chemicals Corporation) (hydrogenated styrene-based thermoplastic elastomer), and 0.5 parts of pentaerythritoltetrakis[3-(3,5-di-t-butyl-4-hydroxyphenyl)propionate] (antioxidant) were mixed using a blender, and the mixture was dried at 75° C. for 6 hours under vacuum (0.1 hPa). The mixture was kneaded and extruded using a twin-screw kneader (in which the atmosphere inside the hopper was replaced with nitrogen) (cylinder temperature: 245° C.), and pelletized to obtain a resin composition 1. The content of a low-molecular-weight component in the pellets of the resin composition 1 was measured.

The pellets were dissolved in cyclohexane to prepare a 1% solution, and a cast film having a thickness of 1 μm was formed using the solution. The protein adsorption test was performed using the resulting cast film.

The pellets were injection-molded at a resin temperature of 280° C. and a mold temperature of 75° C. to prepare a specimen (thickness 4.0 mm, length: 80 mm, width: 10.0 mm) The impact resistance was measured using the resulting specimen.

Example 2

A resin composition 2 was obtained in the same manner as in Example 1, except that 95 parts of the norbornene-based polymer A and 5 parts of the aromatic vinyl-conjugated diene block copolymer (E) (hydrogenated styrene-based thermoplastic elastomer) were used.

Example 3

A resin composition 3 was obtained in the same manner as in Example 1, except that 90 parts of the norbornene-based polymer A and 10 parts of the aromatic vinyl-conjugated diene block copolymer (E) (hydrogenated styrene-based thermoplastic elastomer) were used. The mold temperature was set to 60° C. when molding the resin composition 3.

Example 4

A resin composition 4 was obtained in the same manner as in Example 1, except that 80 parts of the norbornene-based polymer A and 20 parts of the aromatic vinyl-conjugated diene block copolymer (E) (hydrogenated styrene-based thermoplastic elastomer) were used. The mold temperature was set to 50° C. when molding the resin composition 4.

Example 5

A resin composition 5 was obtained in the same manner as in Example 1, except that 50 parts of the norbornene-based polymer A and 50 parts of the aromatic vinyl-conjugated diene block copolymer (E) (hydrogenated styrene-based thermoplastic elastomer) were used. The mold temperature was set to 50° C. when molding the resin composition 5.

Example 6

A resin composition 6 was obtained in the same manner as in Example 1, except that 70 parts of the norbornene-based polymer B obtained in Production Example 2 and 30 parts of the aromatic vinyl-conjugated diene block copolymer (E) (hydrogenated styrene-based thermoplastic elastomer) were used. The mold temperature was set to 50° C. when molding the resin composition 6.

Comparative Example 1

A resin composition 15 was obtained in the same manner as in Example 1, except that the aromatic vinyl-conjugated diene block copolymer (E) (hydrogenated styrene-based thermoplastic elastomer) was not used.

Comparative Example 2

A resin composition 16 was obtained in the same manner as in Example 1, except that 30 parts of the norbornene-based polymer A and 70 parts of the aromatic vinyl-conjugated diene block copolymer (EC) (hydrogenated styrene-based thermoplastic elastomer) were used. The mold temperature was set to 30° C. when molding the resin composition 16.

Comparative Example 3

A resin composition 17 was obtained in the same manner as in Example 3, except that vacuum drying was not performed, the atmosphere inside the hopper was not replaced with nitrogen, and the cylinder temperature was set to 300° C.

Comparative Example 4

A resin composition 18 was obtained in the same manner as in Example 1, except that vacuum drying was not performed, and the atmosphere inside the hopper was not replaced with nitrogen.

Comparative Example 5

A resin composition 19 was obtained in the same manner as in Example 2, except that vacuum drying was not performed, and the atmosphere inside the hopper was not replaced with nitrogen.

Table 1 shows the results obtained in Examples 1 to 6 and Comparative Examples 1 to 5.

TABLE 1

| | | Example | | | | | | Comparative Example | | | | |
|---|---|---|---|---|---|---|---|---|---|---|---|---|
| | | 1 | 2 | 3 | 4 | 5 | 6 | 1 | 2 | 3 | 4 | 5 |
| Resin composition | | 1 | 2 | 3 | 4 | 5 | 6 | 15 | 16 | 17 | 18 | 19 |
| Vacuum drying | | Performed | Performed | Performed | Performed | Performed | Performed | Performed | Performed | Not performed | Not performed | Not performed |
| Norbornene-based polymer (parts) | A | 99 | 95 | 90 | 80 | 50 | | 100 | 30 | 90 | 99 | 95 |
| | B | | | | | | 70 | | | | | |
| Aromatic vinyl-conjugated diene block copolymer (E) (hydrogenated styrene-based thermoplastic elastomer) (parts) | | 1 | 5 | 10 | 20 | 50 | 30 | 0 | 70 | 10 | 1 | 5 |
| Content (%) of low-molecular-weight component | | 0.5 | 0.8 | 1.2 | 1.3 | 1.3 | 2.1 | 0.3 | 1.5 | 3.4 | 3.1 | 3.1 |
| Protein adsorption (μm) | | 0.3 | 0.3 | 0.3 | 0.3 | 0.4 | 0.5 | 0.2 | 0.7 | 0.9 | 0.7 | 0.8 |
| Izod impact strength (J/m) | | 240 | 390 | 450 | 520 | 600 | 350 | 40 | 630 | 450 | 240 | 380 |

Example 7

99 parts of the norbornene-based polymer A obtained in Production Example 1, 1 part of the block copolymer (C) including an aromatic vinyl compound-based polymer block and an isobutylene-based polymer block, and 0.5 parts of pentaerythritoltetrakis[3-(3,5-di-t-butyl-4-hydroxyphenyl) propionate] (antioxidant) were mixed using a blender, and the mixture was dried at 75° C. for 6 hours under vacuum (0.1 hPa). The mixture was kneaded and extruded using a twin-screw kneader (in which the atmosphere inside the hopper was replaced with nitrogen) (cylinder temperature: 245° C.), and pelletized to obtain a resin composition 7. The content of a low-molecular-weight component in the pellets of the resin composition 7 was measured.

The pellets were dissolved in cyclohexane to prepare a 1% solution, and a cast film having a thickness of 1 μm was formed using the solution. The protein adsorption test was performed using the resulting cast film.

The pellets were injection-molded at a resin temperature of 280° C. and a mold temperature of 75° C. to prepare a specimen (thickness 4.0 mm, length: 80 mm, width: 10.0 mm). The impact resistance was measured using the resulting specimen.

Example 8

A resin composition 8 was obtained in the same manner as in Example 7, except that 95 parts of the norbornene-based polymer A and 5 parts of the block copolymer (C) including an aromatic vinyl compound-based polymer block and an isobutylene-based polymer block were used.

Example 9

A resin composition 9 was obtained in the same manner as in Example 7, except that 90 parts of the norbornene-based polymer A and 10 parts of the block copolymer (C) including an aromatic vinyl compound-based polymer block and an isobutylene-based polymer block were used. The mold temperature was set to 60° C. when molding the resin composition 9.

Example 10

A resin composition 10 was obtained in the same manner as in Example 7, except that 80 parts of the norbornene-based polymer A and 20 parts of the block copolymer (C) including an aromatic vinyl compound-based polymer block and an isobutylene-based polymer block were used. The mold temperature was set to 50° C. when molding the resin composition 10.

Example 11

A resin composition 11 was obtained in the same manner as in Example 7, except that 50 parts of the norbornene-based polymer A and 50 parts of the block copolymer (C) including an aromatic vinyl compound-based polymer block and an isobutylene-based polymer block were used. The mold temperature was set to 50° C. when molding the resin composition 11.

Example 12

A resin composition 12 was obtained in the same manner as in Example 7, except that 90 parts of the norbornene-based polymer A and 10 parts of the block copolymer (D) including an aromatic vinyl compound-based polymer block and an isobutylene-based polymer block were used. The mold temperature was set to 60° C. when molding the resin composition 12.

Example 13

A resin composition 13 was obtained in the same manner as in Example 7, except that 50 parts of the norbornene-based polymer A and 50 parts of the block copolymer (D) including an aromatic vinyl compound-based polymer block and an isobutylene-based polymer block were used. The mold temperature was set to 50° C. when molding the resin composition 13.

Example 14

A resin composition 14 was obtained in the same manner as in Example 7, except that 90 parts of the norbornene-based polymer B obtained in Production Example 2 and 10 parts of the block copolymer (C) including an aromatic vinyl compound-based polymer block and an isobutylene-based polymer block were used. The mold temperature was set to 50° C. when molding the resin composition 14.

Comparative Example 6

A resin composition 20 was obtained in the same manner as in Example 9, except that 35 parts of the norbornene-based polymer A and 65 parts of the block copolymer (C) including an aromatic vinyl compound-based polymer block and an isobutylene-based polymer block were used. The mold temperature was set to 30° C. when molding the resin composition 20.

Comparative Example 7

A resin composition 21 was obtained in the same manner as in Example 9, except that vacuum drying was not performed, the atmosphere inside the hopper was not replaced with nitrogen, and the cylinder temperature was set to 300° C.

Comparative Example 8

A resin composition 22 was obtained in the same manner as in Example 7, except that vacuum drying was not performed, and the atmosphere inside the hopper was not replaced with nitrogen.

Comparative Example 9

A resin composition 23 was obtained in the same manner as in Example 8, except that vacuum drying was not performed, and the atmosphere inside the hopper was not replaced with nitrogen.

Table 2 shows the results obtained in Examples 7 to 14 and Comparative Examples 6 to 9.

TABLE 2

| | Example | | | | | | | | Comparative Example | | | |
|---|---|---|---|---|---|---|---|---|---|---|---|---|
| | 7 | 8 | 9 | 10 | 11 | 12 | 13 | 14 | 6 | 7 | 8 | 9 |
| Resin composition | 7 | 8 | 9 | 10 | 11 | 12 | 13 | 14 | 20 | 21 | 22 | 23 |
| Vacuum drying | Performed | Performed | Performed | Performed | Performed | Performed | Performed | Performed | Performed | Not performed | Not performed | Not performed |
| Norbornene-based polymer (parts) A | 99 | 95 | 90 | 80 | 50 | 90 | 50 | | 35 | 90 | 99 | 95 |
| B | | | | | | | | 90 | | | | |
| Block copolymer (C) including aromatic vinyl compound-based polymer block and isobutylene-based polymer block (parts) | 1 | 5 | 10 | 20 | 50 | | | 10 | 65 | 10 | 1 | 5 |
| Block copolymer (D) including aromatic vinyl compound-based polymer block and isobutylene-based polymer block (parts) | | | | | | 10 | 50 | | | | | |
| Content (%) of low-molecular-weight component | 0.3 | 0.7 | 1.3 | 1.5 | 1.9 | 1.1 | 1.8 | 1.5 | 1.8 | 3.8 | 3.1 | 3.3 |
| Protein adsorption (μm) | 0.3 | 0.2 | 0.2 | 0.3 | 0.5 | 0.2 | 0.5 | 0.5 | 0.7 | 1.0 | 0.8 | 0.9 |
| Izod impact strength (J/m) | 220 | 380 | 460 | 510 | 600 | 450 | 550 | 250 | 650 | 470 | 220 | 360 |

The following were confirmed from the results shown in Tables 1 and 2.

The formed articles obtained using the resin composition according to the invention exhibited excellent impact resistance and low protein adsorption (Examples 1 to 14).

The impact resistance was inferior when using only the norbornene-based polymer (Comparative Example 1). When the ratio of the aromatic vinyl-conjugated diene block copolymer (hydrogenated styrene-based thermoplastic elastomer) was high, protein adsorption increased (Comparative Example 2). When the content of a low-molecular-weight component increased since vacuum drying was not performed, and decomposition occurred during twin-screw kneading, protein adsorption increased (Comparative Examples 3 to 5).

When the ratio of the block copolymer including an aromatic vinyl compound-based polymer block and an isobutylene-based polymer block was high, protein adsorption increased (Comparative Example 6). When the content of a low-molecular-weight component increased since vacuum drying was not performed, and decomposition occurred during twin-screw kneading, protein adsorption increased (Comparative Examples 7 to 9).

INDUSTRIAL APPLICABILITY

The medicine container that is formed using the resin composition according to the invention can remarkably suppress protein adsorption on the container when the medicine includes a protein. Therefore, the resin composition according to the invention is useful for medicine container applications.

The invention claimed is:

1. A resin composition comprising:
(i) 50 to 80 wt % of a hydrogenated norbornene-based ring-opened polymer relative to a total weight of the resin composition, wherein the hydrogenated norbornene-based ring-opened polymer is a hydrogenated polymerization product of tricyclo[4.3.0$^{1,6}$.1$^{2,5}$]deca-3,7-diene, 8-methyltetracyclo[4.4.0.1$^{2,5}$.1$^{7,10}$]dodeca-3-ene, and tetracyclo[7.4.0.0$^{2,7}$.1$^{10,13}$]trideca-2,4,6,11-tetraene, and
(ii-a) 20 to 50 wt % of a at least one hydrogenated styrene-based thermoplastic elastomer selected from the group consisting of a styrene-ethylene/butylene-styrene block copolymer, a styrene-ethylene/propylene-styrene block copolymer, a partially hydrogenated styrene-ethylene/butylene-styrene block copolymer, and a styrene-(ethylene-ethylene/propylene)-styrene block copolymer, relative to the total weight of the resin composition, or (ii-b) 20 to 50 wt. % of a styrene-isobutylene-styrene triblock copolymer that has not been hydrogenated and has a styrene content of 15 wt. % or more, relative to the total weight of the resin composition,
wherein a content of a low-molecular-weight component having a weight average molecular weight of 1000 or less in the resin composition has been reduced to 3 wt. % or less using a method of preliminary drying of the resin composition, and
wherein an Izod impact strength, determined by performing an Izod impact test in accordance with JIS K 7110 using a specimen having a thickness of 4.0 mm, a length of 80 mm, and a width of 10.0 mm, and being provided with a notch, prepared by injection molding of the resin composition, is 220 to 630 J/m.

2. The resin composition according to claim 1, wherein the resin composition comprises the (ii-a) 20 to 50 wt % of the at least one hydrogenated styrene-based thermoplastic elastomer.

3. The resin composition according to claim 2, wherein the hydrogenated styrene-based thermoplastic elastomer is a styrene-ethylene/butylene-styrene block copolymer.

4. The resin composition according to claim 1, wherein the hydrogenated norbornene-based ring-opened polymer has a glass transition temperature.

5. The resin composition according to claim 1, wherein the content of the low-molecular-weight component having a weight average molecular weight of 1000 or less in the resin composition has been adjusted to a value in the range of from 0.3 wt % to 0.8 wt % using the method of preliminary drying of the resin composition, where the method of preliminary drying is performed under vacuum.

6. The resin composition according to claim 2, wherein the hydrogenated styrene-based thermoplastic elastomer is a block copolymer that has a weight average molecular weight in the range of from 40,000 to 500,000, and
the block copolymer is at least one selected from the group consisting of
a styrene-ethylene/butylene-styrene block copolymer, and
a partially hydrogenated styrene-ethylene/butylene-styrene block copolymer.

7. The resin composition according to claim 5, wherein the low-molecular-weight component having a weight average molecular weight of 1000 or less comprises resinous components having a weight average molecular weight of 1000 or less.

8. The resin composition according to claim 7, wherein the resinous components include unreacted monomers.

9. The resin composition according to claim 5, wherein the low-molecular-weight component having a weight average molecular weight of 1000 or less comprises a low molecular weight component derived from the hydrogenated styrene-based thermoplastic elastomer or the styrene-isobutylene-styrene triblock copolymer.

10. The resin composition according to claim 5, wherein the low-molecular-weight component having a weight average molecular weight of 1000 or less comprises solvent, unreacted monomers, and molecules derived from components used to form the hydrogenated polymerization product.

11. A resin composition consisting of:
(i) 50 to 80 wt % of a hydrogenated norbornene-based ring-opened polymer relative to a total weight of the resin composition, wherein the hydrogenated norbornene-based ring-opened polymer is a hydrogenated polymerization product of tricyclo[$4.3.0^{1,6}.1^{2,5}$]deca-3,7-diene, 8-methyltetracyclo[$4.4.0.1^{2,5}.1^{7,10}$]dodeca-3-ene, and tetracyclo[$7.4.0.0^{2,7}.1^{10,13}$]trideca-2,4,6,11-tetraene,
(ii-a) 20 to 50 wt % of at least one hydrogenated styrene-based thermoplastic elastomer selected from the group consisting of a styrene-ethylene/butylene-styrene block copolymer, a styrene-ethylene/propylene-styrene block copolymer, a partially hydrogenated styrene-ethylene/butylene-styrene block copolymer, and a styrene-(ethylene-ethylene/propylene)-styrene block copolymer, relative to the total weight of the resin composition, or (ii-b) 20 to 50 wt. % of a styrene-isobutylene-styrene triblock copolymer that has not been hydrogenated and has a styrene content of 15 wt. % or more, relative to the total weight of the resin composition, and
(iii) optionally, one or more additives selected from the group consisting of an antioxidant, a UV absorber, a light stabilizer, a near-infrared absorber, a colorant, a plasticizer, an antistatic agent, and a fluorescent whitening agent;
wherein a content of a low-molecular-weight component having a weight average molecular weight of 1000 or less in the resin composition has been reduced to 3 wt. % or less using a method of preliminary drying of the resin composition, and
wherein an Izod impact strength, determined by performing an Izod impact test in accordance with JIS K 7110 using a specimen having a thickness of 4.0 mm, a length of 80 mm, and a width of 10.0 mm, and being provided with a notch, prepared by injection molding of the resin composition, is 220 to 630 J/m.

12. The resin composition according to claim 11, wherein the additive is present in the resin composition, and the additive is the near-infrared absorber.

13. The resin composition according to claim 11, wherein the additive is present in the resin composition, and the additive is the fluorescent whitening agent.

14. A medicine container comprising an inner wall formed from a resin composition comprising:
(i) 50 to 80 wt % of a hydrogenated norbornene-based ring-opened polymer relative to a total weight of the resin composition, wherein the hydrogenated norbornene-based ring-opened polymer is a hydrogenated polymerization product of tricyclo[$4.3.0^{1,6}.1^{2,5}$]deca-3,7-diene, 8-methyltetracyclo[$4.4.0.1^{2,5}.1^{7,10}$]dodeca-3-ene, and tetracyclo[$7.4.0.0^{2,7}.1^{10,13}$]trideca-2,4,6,11-tetraene, and (ii-a) 20 to 50 wt % of at least one hydrogenated styrene-based thermoplastic elastomer selected from the group consisting of a styrene-ethylene/butylene-styrene block copolymer, a styrene-ethylene/propylene-styrene block copolymer, a partially hydrogenated styrene-ethylene/butylene-styrene block copolymer, and a styrene-(ethylene-ethylene/propylene)-styrene block copolymer, relative to the total weight of the resin composition, or (ii-b) 20 to 50 wt. % of a styrene-isobutylene-styrene triblock copolymer that has not been hydrogenated and has a styrene content of 15 wt. % or more, relative to the total weight of the resin composition;
wherein a low-molecular-weight component having a weight average molecular weight of 1000 or less in the resin composition has been reduced to 3 wt. % or less using a method of preliminary drying of the resin composition before forming the resin composition into the container;
wherein an Izod impact strength, determined by performing an Izod impact test in accordance with JIS K 7110 using a specimen having a thickness of 4.0 mm, a length of 80 mm, and a width of 10.0 mm, and being provided with a notch, prepared by injection molding of the resin composition, is 220 to 630 J/m; and
the inner wall is configured to contact the medicine.

15. The medicine container of claim 14, wherein the medicine container contains a medicine that includes a protein.

* * * * *